Nov. 24, 1959  W. DE BOER ET AL  2,913,963
3-DIMENSION CONTOUR MACHINE
Filed Nov. 7, 1957  6 Sheets-Sheet 1

INVENTORS
WILLIS DE BOER,
& JOSEPH F. CONTE
BY
RICHEY, WATTS, EDGERTON,
McNENNY & FARRINGTON
ATTORNEYS

Nov. 24, 1959 W. DE BOER ET AL 2,913,963
3-DIMENSION CONTOUR MACHINE
Filed Nov. 7, 1957 6 Sheets-Sheet 4

INVENTORS
WILLIS DE BOER,
& JOSEPH F. CONTE
BY
RICHEY, WATTS, EDGERTON,
McNENNY & FARRINGTON
A H Edgerton
ATTORNEYS

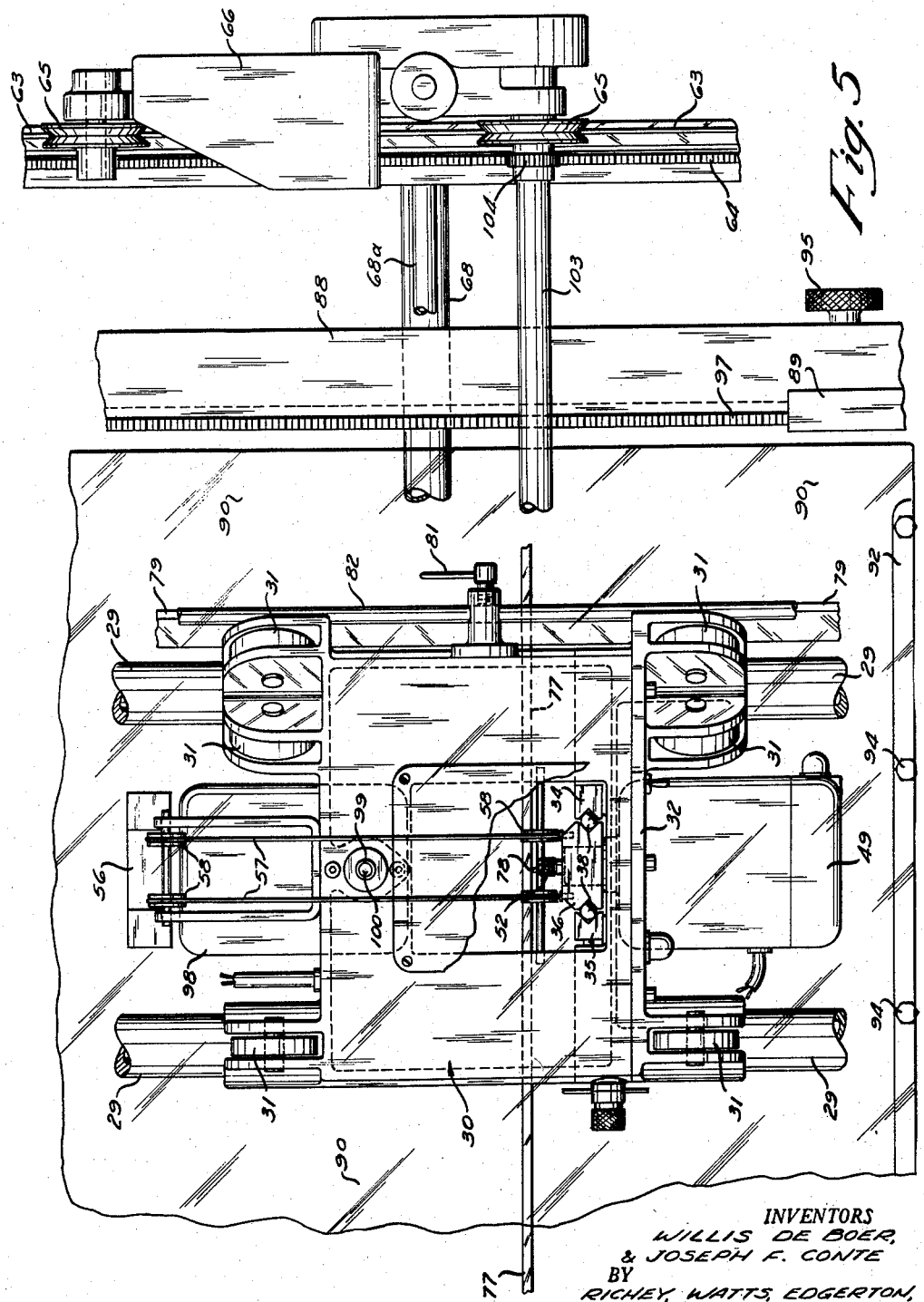

INVENTORS
WILLIS DE BOER,
& JOSEPH F. CONTE
BY
RICHEY, WATTS, EDGERTON,
McNENNY & FARRINGTON
ATTORNEYS

United States Patent Office 2,913,963
Patented Nov. 24, 1959

2,913,963
3-DIMENSION CONTOUR MACHINE

Willis De Boer and Joseph F. Conte, Rochester, N.Y., assignors to Optical Gaging Products Inc., Rochester, N.Y., a corporation of New York Application November 7, 1957, Serial No. 695,138

4 Claims. (Cl. 90—13)

This invention relates to machines for tracing the contour of a face of an irregular body and making a precision profile record thereof. The invention further contemplates a machine for reproducing the outline of a transverse section of a body, such as a section developed by passing a plane normal to the medial axis thereof through any desired point in the perimeter of the body.

In the production of curvilinear bodies, which are to be assembled in mating relation with other curved bodies in a machine, it is essential that replicas thereof be uniform in length, width, height and profile in order to assure the lineal continuity of the parts and thus preserve the aesthetic appearance of the design. In making tools, dies and pattern from a mockup of the machine, it is not only necessary to make one or more planar views of sections of the curvilineal body and details thereof to facilitate duplication, but it is also necessary to employ such outlines as comparators in checking the dimensions and contours of the parts produced by the tools.

Surface development is a highly skilled art and requires, in the absence of instrumentation, long and arduous work, the application of advanced mathematics, and the services of trained artisans.

One of the objects of the invention is to provide a machine embodying a probe or tracing stylus with a spherical head thereon which, when moved over or across the work, will control the movement of a cutter to delineate like contours on vertical and horizontally disposed coated glass plates or panels.

Another object of the invention is to provide a rotary cutter head having a fly tool therein which is offset from the axis of rotation of the head a distance equal to the radius of the ball on the probe so the tool will develop a continuous series of overlapping circles defining the path of movement of the probe over the work and the consequent inscription of the profile of the workpiece being traced.

Another object of the invention is to provide a probe having a ball on the end thereof which is designed to follow undulations and declivities in a workpiece with accuracy and freedom of movement and thus effect precise duplication of the movement of the cutter controlled thereby without vibration, backlash or deviations from the line of translation of the probe.

Another object of the invention resides in the provision of a machine having a coated horizontal plate therein for the recordation of lineal profiles of the work and a coated vertical plate for recordation of transaxial profile outlines.

Further objects of the invention reside in the provision of a machine which is designed to produce precision tracings, a machine which is simple of design, efficient of operation and provided with certain adjustable parts thereinto accommodate workpieces of various size and form.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

Fig. 5 is a plan view, shown on an enlarged scale, of the tracer carriage, the parts below the glass plate being shown in full lines, and certain portions of the frame being omitted in the interest of clarity;

Fig. 6 is a side elevational view shown on an enlarged scale of the tracer probe of the machine;

Figure 1:
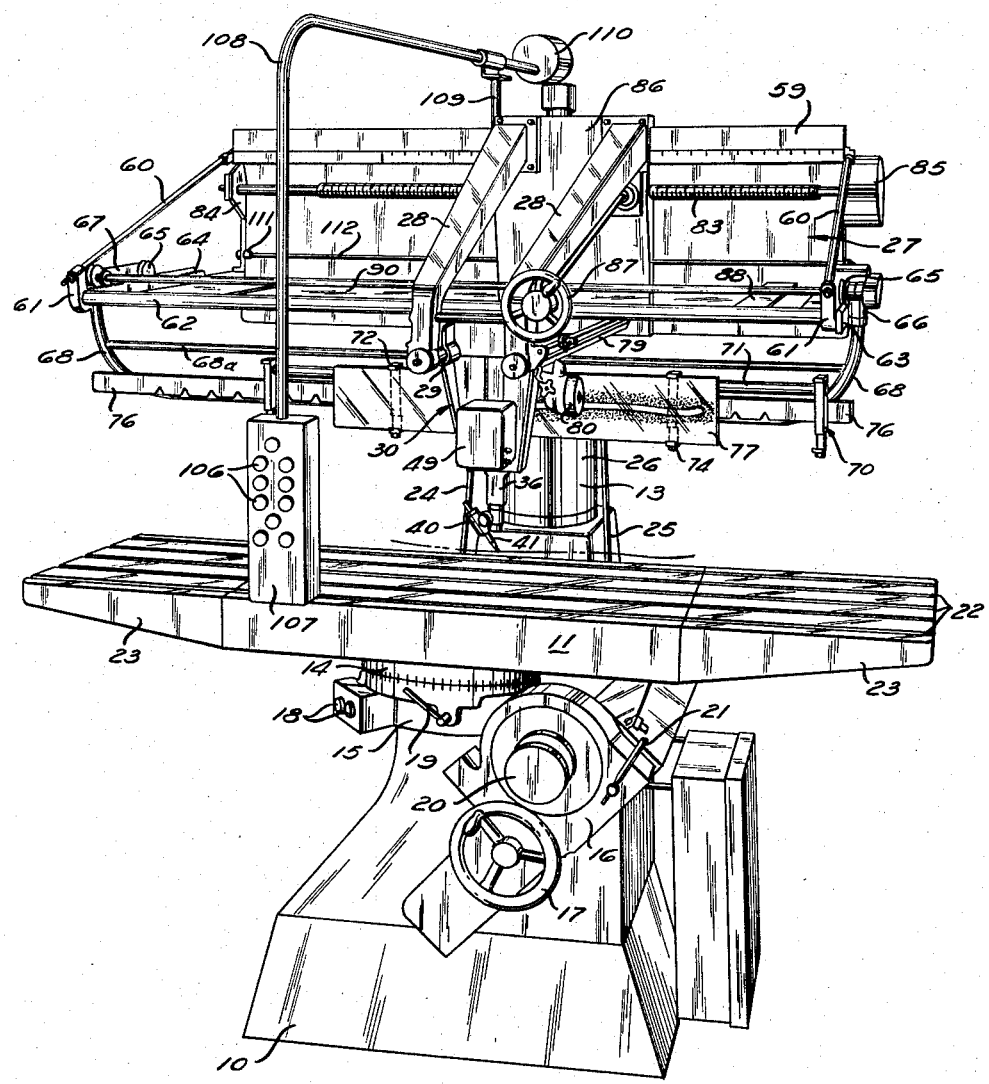
Fig. 1 is a view in perspective of the forward face of the improved machine.
Figure 2:
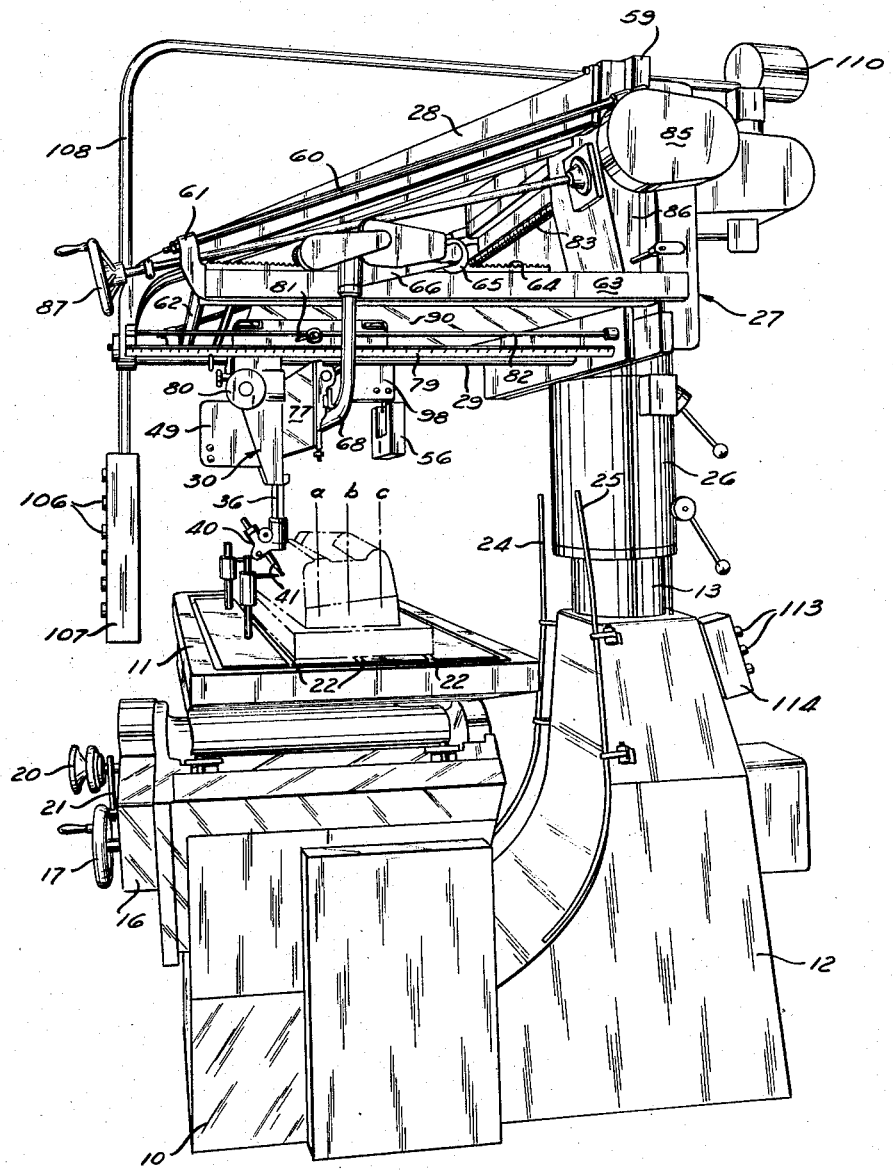
Fig. 2 is a perspective of the end of the machine shown in Fig. 1.

Referring first to Figs. 1 and 2, the machine comprises a base 10 having a horizontal work supporting table 11 thereon and a vertically disposed pedestal 12 carried thereby for the reception of a column 13. The table is formed with a boss 14 on the lower face thereof engaged with a similar boss 15 on a bracket carried by a gear housing 16 on the base 10. The table is pivotally mounted on a cross shaft (not shown), and may be tilted angularly from its horizontal position by a hand wheel 17. The drive gearing is controlled by push buttons 18 on the boss 15 and is locked in place by a lever 19. The table may also be rotated by a hand wheel 20 or power driven gearing and locked in place by a lever 21 on the gear housing. The upper face of the table is provided with lineal T slots 22 for clamping bolts to secure the work in place, and the ends of the table are machine faced, drilled and tapped to receive extension plates 23. The table and plates are preferably constructed of aluminum, and a pair of power cut-out rods 24 and 25 are provided on the pedestal 12 to arrest movement of the gear drive set when the table is rotated with the extension plates 23 in place.

Figure 3:
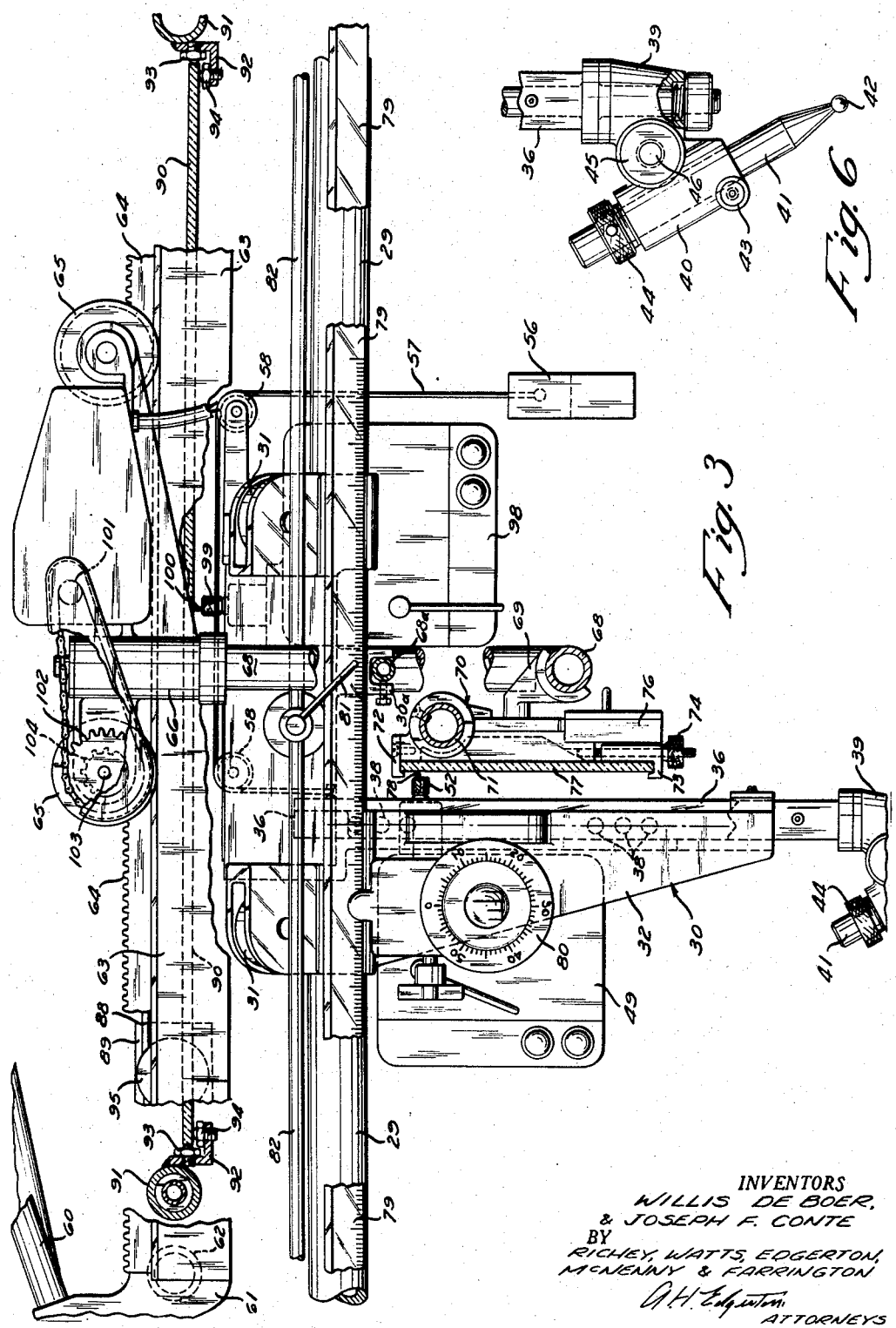
Fig. 3 is an end elevational view, shown on an enlarged scale, of a fragmentary portion of the top of the machine illustrating the tracer carriage, portions of the machine being broken away and shown in section in the interest of clarity.
Figure 7:
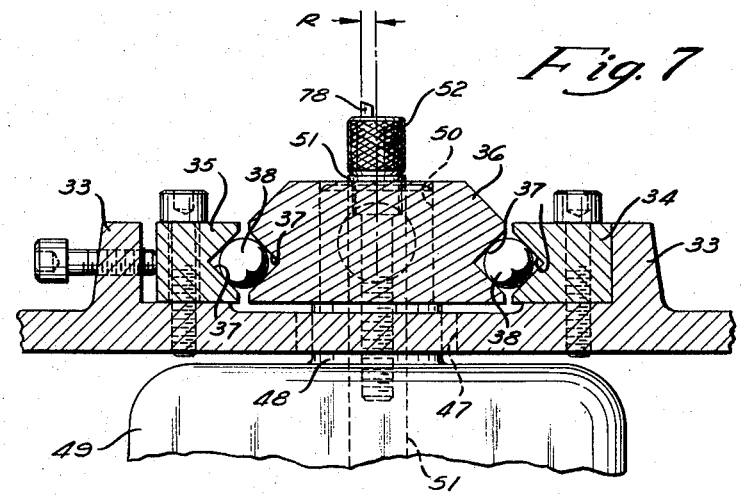
Fig. 7 is a transverse sectional view of the slide and bearing therefor, the section being taken on a plane indicated by the line 7—7 in Fig. 4.

The upper end of the column 13 is provided with a telescopic sleeve 26 graduated in degrees at its lower end and having a frame 27 thereon which carries a saddle assembly having a pair of parallel arms 28 that overhang the table 11 and support a pair of guide bars 29 disposed in parallel relation with the transverse axis of the table and normal to the vertical axis of the column 13. The bars have a carriage 30 mounted on antifriction rollers 31 thereon to facilitate free reciprocative movement thereof. One of the bars is engaged with a single roller for tracking movement upon the upper face thereof, while the other bar is engaged by a pair of rollers arranged in divergent relation with each other to restrain lateral movement of the carriage. The carriage is formed with a depending frame 32 having parallel ribs 33 (Fig. 7) on the rearward face thereof to support respectively, a fixed guide rail 34 and an adjustable rail or gib 35. Both of the rails and the slide 36 are machined with lineal V grooves 37 in the side walls thereof for the reception of preloaded hardened steel balls 38 to accommodate free reciprocative movement of the slide as it is moved vertically over the top of the work. The lower end of the slide 36 supports a probe sleeve 39 (Fig. 6) having a probe holder 40 pivotally mounted thereon for the retention of the tracing probe 41. The lower end of the probe is machined with a spherical head 42 thereon which is precision ground to a given diameter to accommodate the contour of the work. The probe holder 40 is split throughout its length and the probe is clamped therein by a thumb nut 43. The probe may be axially adjusted by a nut 44 locked to the shank thereof, and the probe holder 40 be angularly adjusted by actuation of a thumb nut 45 on the screw 46 that unites the probe holder and sleeve. The probe assembly is free to rotate, but is always held with the center of the sphere in axial alignment with the medial axis of the slide 36. The frame 32 is formed with a slot 47 in the center thereof for clearance with a boss 48 (Figs. 4 and 7) on a motor housing 49 bolted to the slide 36. The outer end of the boss is engaged in an opening 50 in the slide to effect vertical reciprocative movement of the housing with the slide. The boss 48 is bored throughout its length and provided with bushings for a spindle 51 that carries the cutter head 52 for the eccentrically mounted tool. The spindle 51 is driven by a fractional horse power motor (not shown) in the base of the housing 49, and a switch 54 (Fig. 4) for the control of the motor is mounted on a bracket 55 that protrudes laterally from the side of the depending frame 32 on the carriage. The slide 36 is connected to a counter-weight 56 (Fig. 3) by a flexible cable 57 roved over a pair of pulleys 58 mounted on the top of the carriage 30. The function of the counterweight is to minimize the application of pressure of the probe on the work.

The frame 27 supports a horizontal rail 59 having inclined braces 60 affixed to the ends thereof and terminating in brackets 61 on the ends of a tie bar 62. The brackets 61 carry a pair of parallel guide rails 63 and a pair of racks 64. The guide rails 63 are formed with beveled upper faces for engagement with grooved rollers 65 on the carriers 66 and 67 mounted on the guide rails at each end of the machine. The central portion of the carriers support a depending U bar 68 that spans the length of the frame 27. The side arms of the U bar are braced by a tie bar 68a which is engaged by a yoke 30a in the base of the carriage. The yoke is affixed by a set screw to the tie bar and effectuates the in and out movement of the carriage as the horizontal plate 90 is engraved. The ends of the U bar 68 are formed with arcuate side arms having brackets 69 affixed thereon (Fig. 3) for the retention of a glass panel supporting frame 70. The frame embodies a tube 71 having subtended bars thereon with fixed shouldered clamping fingers on the top thereof, and adjustable clamps 73 on their lower ends. The clamps 73 are provided with studs for the reception of shouldered fingers and thumb nuts 74 for adjustment thereof, and the rearward face of one of the subtended bosses of the clamps are provided with a spring loaded plunger to facilitate the locked engagement of the frame 70 with a notched horizontal rail 76. The glass panel 77 is retained in a vertical position by the shouldered clamping fingers 72 and 73 and is engraved by the fly cutter 78 (Fig. 7) while held in such position. The fly tool 78 is mounted in the cutter head 52 to rotate in a path controlled by the horizontal movement of the spherical end 42 of the probe 40 over the work. The dimension line R in Fig. 7, indicates the radius from the axis of rotation of the head 52 to the outer edge of the cutter which is set to equal the radius of the sphere 42 on the end of the probe 40, thus as the probe moves over the work, an arcuate facsimile thereof will be duplicated by lines of tangency to the overlapping circles developed by rotation of the cutter. A scale 79 is mounted in parallel relation to one of the guide bars 29, and an optical unit 80 having a magnifying glass therein, is mounted on the carriage 30 for observation of the graduations on the scale to facilitate adjustment of the progressive vertical sections, such as indicated by the lines a, b and c in Fig. 2. The carriage is locked in place when it is moved horizontally across the work by the lever 81 affixed to a screw which engages a rod 82 parallel the guide bars 29. A lead screw 83 is supported on one end by a bracket 84, and the opposed end thereof is retained and driven by a motor 85. The screw is engaged with a nut (not shown) connected to the saddle 86 for power driven translation thereof. If desired, the motor 85 may be shut off and the saddle 86 moved manually by a hand wheel 87 on a shaft connected to a pinion entrained with gearing coupled with the nut on the lead screw 83.

Figure 4:
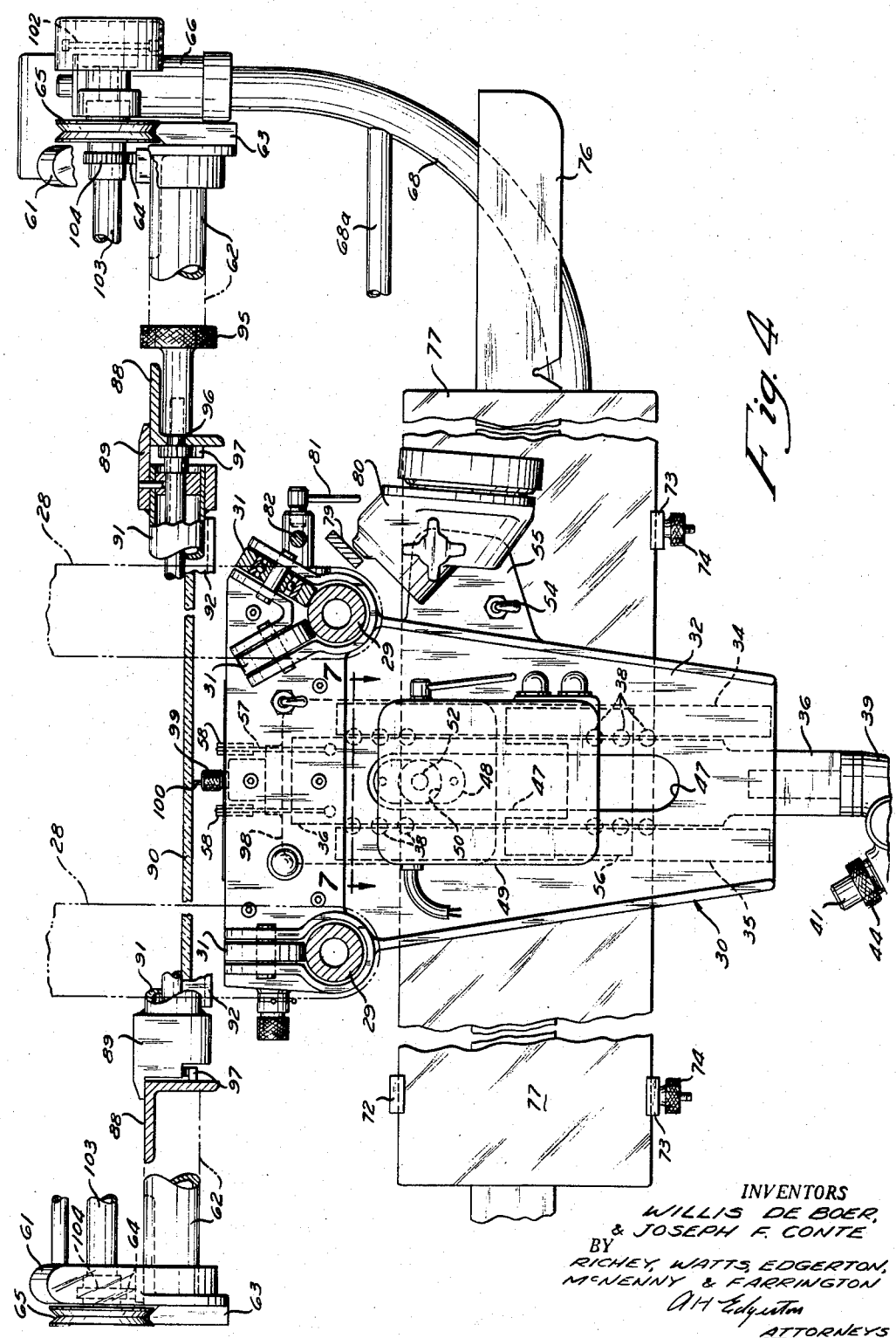
Fig. 4 is a front elevational view, shown on an enlarged scale, of the tracer mechanism of the machine illustrated in Fig. 1, certain parts thereof being omitted, and other parts of the machine being broken away and shown in section.

A pair of angular iron frame members 88 are mounted between the frame 27 and the tie bar 62 (Fig. 4). The frame members 88 support clips 89 for the retention of a horizontal coated glass panel 90. The ends of the plate are supported by tubes 91 having angular rails 92 mounted thereon which retain adjusting screws 93 and 94 that may be adjusted to impinge the outer ends of the glass panel. The clips 89 may be moved along the rails 88 to accommodate panels of various length by rotation of the thumb nut 95 having pinions 96 thereon which are entrained with racks 97 secured to the inner faces of the rails of the angular frame members 88.

A second motor housing 98 (Fig. 3), similar to the motor and housing assembly 49, is attached to the upper end of the carriage 30 to provide the engraving medium for the horizontal plate 90. The housing 98 includes a motor, a cutter head 99 and fly tool 100 of the form of the tool 78 for removal of the coating on the glass panel 77. The power driven carrier 66 has a sprocket 101 mounted on a motor driven shaft which is connected through a chain to a second sprocket 102 on a cross shaft 103. The shaft 103 retains a pair of pinions 104 entrained with the racks 64 to provide a power driven unit for the in and out movement of the carriage 30.

Figure 8:
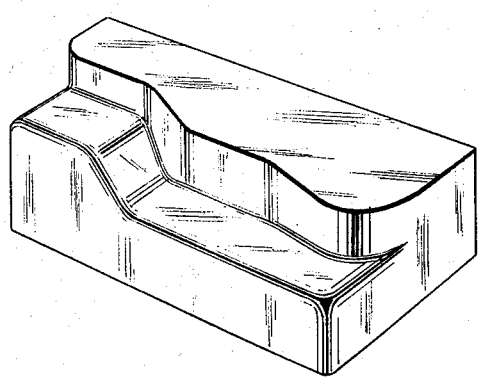
Fig. 8 is a view in perspective of a workpiece of a typical form.
Figure 9:
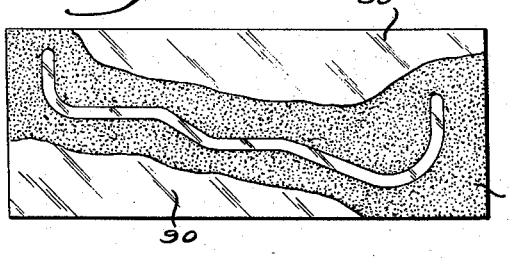
Fig. 9 illustrates a plan view of the horizontal glass plate and the outline developed from the workpiece shown in Fig. 8.
Figure 10:
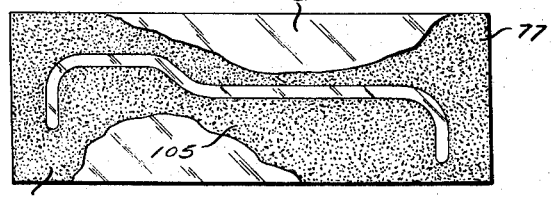
Fig. 10 illustrates the vertical glass plate of the side or front view development of Fig. 8.
Figure 11:
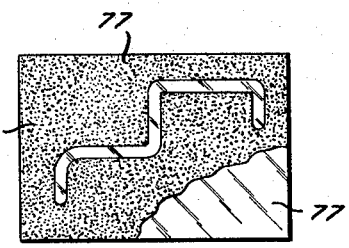
Fig. 11 illustrates the vertical glass plate of a sectional view development of Fig. 8.

The horizontal profile of the work, illustrated in Fig. 8, is developed on the vertical glass panel 77, and the vertical profile or plan view of the work is developed on the horizontal panel 90, as illustrated in Fig. 9. As shown, the circular path made by the fly tools 78 and 100 correspond to the contours of the workpiece; Fig. 9 corresponding to the top surface of the work; and Fig. 10 corresponding to the form of the side or front of the work. Fig. 11 indicates a vertical section through the work, which as pointed out above, may be taken on a plane through any desired point throughout the perimeter of the work. In Figs. 9, 10 and 11, the coating or emulsion 105 is indicated by stippling, and the trace with the coating removed by the fly cutters is indicated thereon.

The various motors in the machine are controlled by electric switches 106 mounted in a pendulous junction box 107 suspended by a tubular conduit 108 in the manner shown in Figs. 1 and 2. The conduit is supported for pivotal movement on a stanchion 109 on the frame 27, and a counter-weight 110 is provided on an extended rearward portion thereof to implement manipulation of the junction box when it is moved around the machine. Adjustable safety stops 111 connected to micro switches are mounted on a rod 112 for engagement with the saddle 86 to arrest translation thereof at the outer ends of the machine. The switches in the junction box are wired to control right, left, fast, slow or jogging movements of the carriage assembly 30. Power driven elevation of the column sleeve 26 is controlled by switches 113 in a junction box 114 mounted on the rearward face of the pedestal 12.

The etchings obtained by actuation of the rotary fly tools may be placed in an optical comparator containing a master drawing of the part to verify the registration of the outline of the engraved surface with that of the drawing. The comparator may alternately be used for the production of a drawing of the part or tool, such for example, as a contour reproduction from a finished mockup in styling an automobile body.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A machine for making a graphic outline of a portion of an irregular pattern comprising a base, a horizontal table thereon for the support of the pattern, a vertical column on said base adjacent and protruding above said table, a horizontal frame on said column above and parallel the top of said table, a saddle on said frame, power actuated means connected to said saddle for the reciprocative movement thereof, a coated vertical glass panel workpiece carried by said frame, guide rails on the ends of said frame normal thereto and parallel the top of said table, bars constituting a track connected to said saddle in normal horizontal relation thereto, a carriage mounted for reciprocative movement on said bars, a vertical reciprocative slide depending from the forward end of said carriage, a probe mounted on the lower end of said slide and abutting a face of the pattern, a counter-weight urging said probe against said pattern, an electric motor supported by said carriage, a rotary cutting tool connected to said motor and abutting said panel, said probe guiding the vertical movement of said cutting tool over said panel while said saddle moves horizontally.

2. A machine for making a graphic outline of portions of an irregular pattern comprising a base, a horizontal table thereon for the support of the pattern, a vertical column on said base adjacent said table and protruding above the table, a horizontal frame on said column above and parallel to the top of said table, a saddle on said frame, power actuated means connected to said saddle for the reciprocative movement thereof, a coated panel workpiece carried by said frame, guide rails on the ends of said frame normal thereto and parallel the top of said table, a track connected to said saddle in normal horizontal relation thereto, a carriage mounted for reciprocative movement on said track, a vertical reciprocative slide depending from said carriage, a probe mounted on the lower end of said slide and abutting a face of said pattern, means urging said probe against said pattern, an electric motor on said carriage, a rotary cutting tool on said motor and abutting said panel workpiece, said probe guiding the translation of said cutting tool over said panel workpiece during the translation of said carriage and saddle.

3. A machine for making a graphic outline of a portion of an irregular pattern comprising a base, a table for the support of the pattern, a vertical column on said base adjacent to and protruding above said table, a horizontal frame on said column above said table, a saddle on said frame, power actuated means connected to said saddle for the reciprocative movement thereof, a coated vertical panel workpiece carried by said frame, guide rails on said frame normal thereto and parallel the top of said table, a track on said saddle normal thereto, a carriage mounted for reciprocative movement on said track, a vertical reciprocative slide depending from said carriage, a probe mounted on said slide and abutting a face of the pattern, means urging said probe against said pattern, an electric motor on said carriage, a rotary cutting tool on said motor abutting said panel, said probe guiding the vertical movement of said cutting tool over said panel while said saddle moves horizontally.

4. A machine for making a graphic outline of a pattern comprising a base, a table thereon for the support of the pattern, a vertical column on said base protruding thereover, a horizontal frame on said column above the top of said table, a saddle on said frame, power actuated means connected to said saddle for the reciprocative movement thereof, a coated horizontal panel workpiece carried by said frame, guide rails on the ends of said frame normal thereto, a track connected to said saddle in normal horizontal relation thereto, a carriage mounted for reciprocative movement on said track, a vertical slide depending from the forward end of said carriage, a probe on the lower end of said slide abutting a face of said pattern, an electric motor on said carriage, a rotary cutting tool connected to said motor and abutting said panel workpiece, said probe guiding the translation of said cutting tool over said panel workpiece during the translation of said carriage.

References Cited in the file of this patent

UNITED STATES PATENTS

| | | |
|---|---|---|
| 2,089,632 | Watson | Aug. 10, 1937 |
| 2,656,766 | Martens et al. | Oct. 27, 1953 |
| 2,789,354 | Polidor et al. | Apr. 23, 1957 |
| 2,794,371 | Roehm | June 4, 1957 |